Sept. 10, 1946. J. F. GREGG 2,407,490
SURFACE CHECKING AND COMPARING DEVICE
Filed May 11, 1945 2 Sheets-Sheet 2
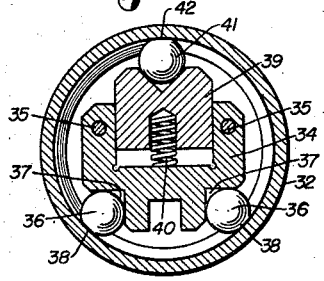
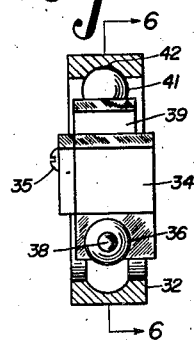
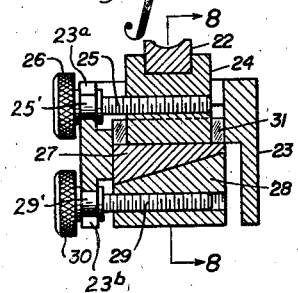
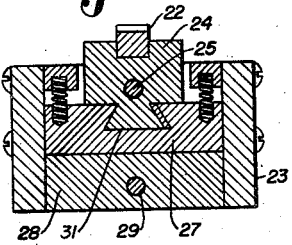
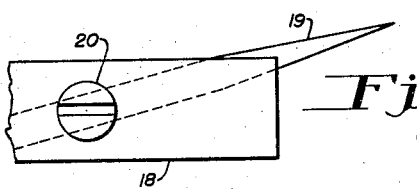
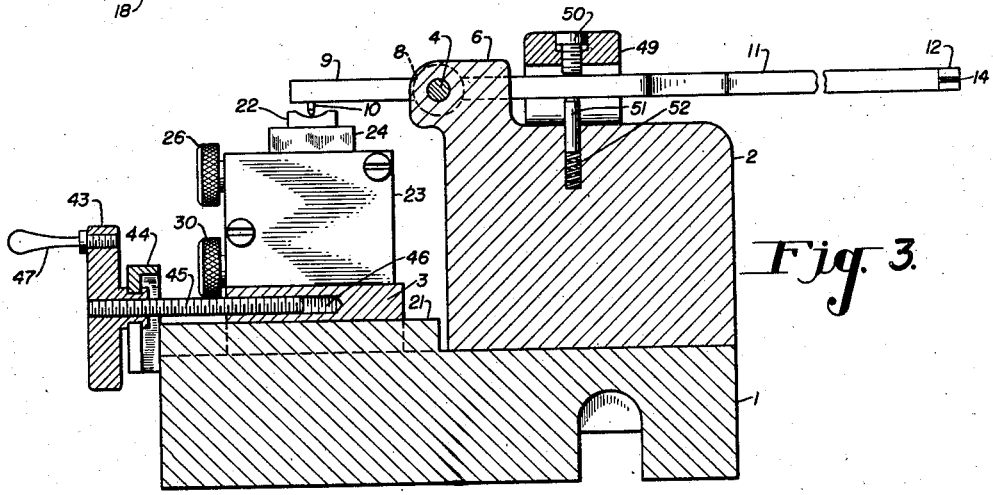
INVENTOR.
JONAS FLOYD GREGG
BY
Frank H. Harmon
ATTORNEY Patented Sept. 10, 1946

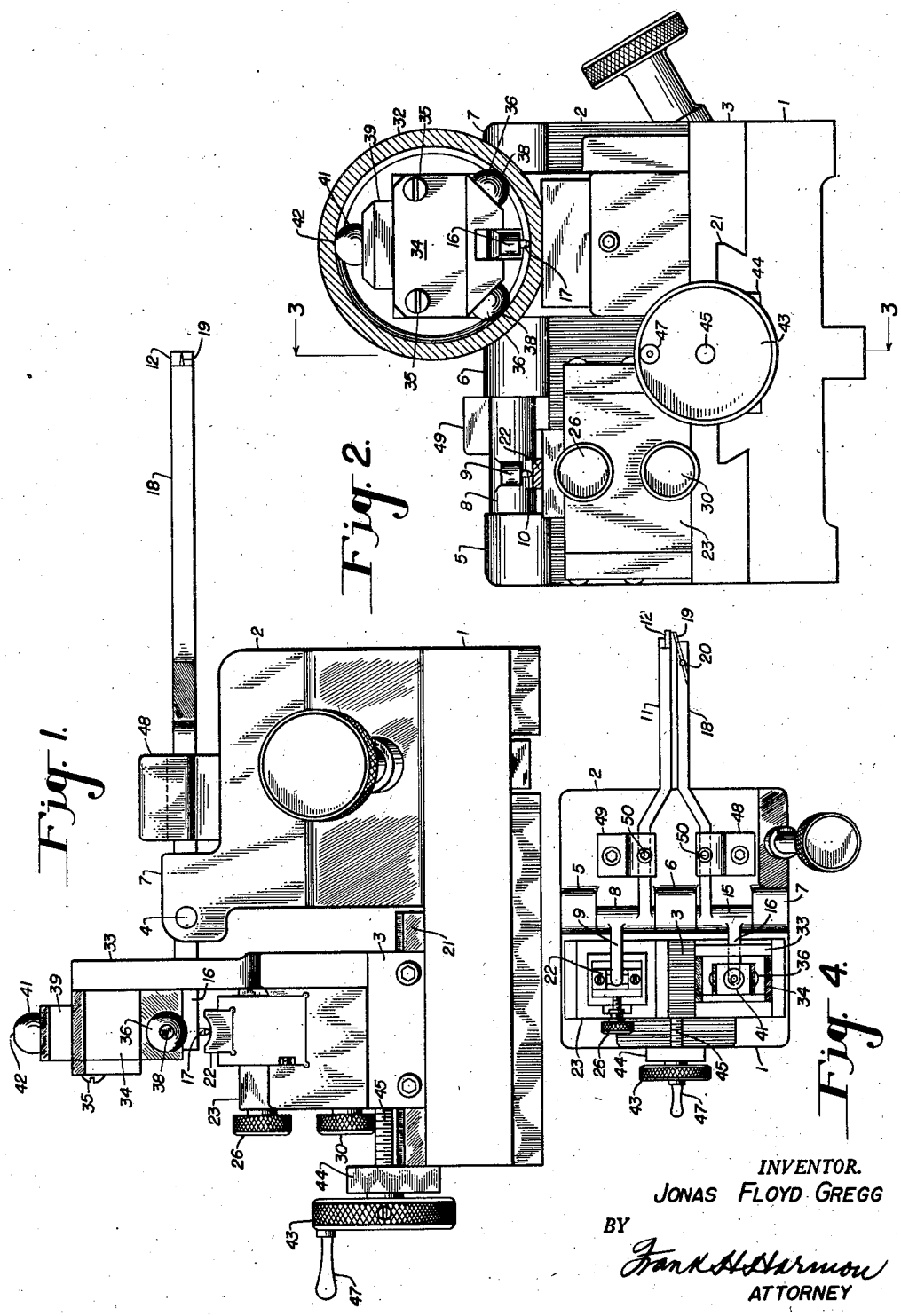

2,407,490

UNITED STATES PATENT OFFICE 2,407,490

SURFACE CHECKING AND COMPARING DEVICE

Jonas Floyd Gregg, Cleveland, Ohio, assignor, by mesne assignments, to Jack & Heintz Precision Industries, Inc., Cleveland, Ohio, a corporation of Delaware Application May 11, 1945, Serial No. 593,167

10 Claims. (Cl. 33—174)

1

This invention relates to measuring devices and has for one of its primary objects to provide a device for visually comparing the curved surface of a specimen with that of a master, or known surface, and for indicating in increments of linear measurements the coincidence or lack of coincidence thereof.

Such a device has wide application and particularly so in the mass production and final check of ball bearing races for precision devices wherein the tolerances in the cross sectional curvature are critical and necessarily small.

Briefly it is proposed to provide one stylus rotatable about a fixed axis and carrying at one end a stylus point to ride upon a master race and having its outer end carry a scale. A second stylus is rotatable independently of the first stylus but about an axis in alignment therewith. The second stylus carries a pointer at its outer end and has at its inner end a stylus point to ride on the curved surface of the specimen race to be checked. Means are provided for adjusting the position of the master so that both stylus points rest in the middle, or bottom, of the curvature of its race and the pointer of the specimen stylus is in alignment with a zero reading on the scale carried by the master stylus. Means are also provided for jointly moving the master stylus and specimen stylus together transversely in contact with the curvature of the two races. As long as there is no displacement of the pointer of the specimen stylus with respect to the scale of the other, it follows that the specimen is in accordance with the master. The scale, besides having a zero point may have a spaced indicia on either side of the zero point to indicate the maximum tolerance both ways. Failure or registry of the pointer with a space within the tolerance indicia on the scale justifies the rejection of the sample as unfit for use.

With the foregoing and other objects in view, the invention resides in the combination of parts and in the details of construction hereinafter set forth in the following specification and appended claims, certain embodiments thereof being illustrated in the accompanying drawings, in which:

Figure 1 is a view in side elevation of the device showing the specimen race stylus and showing the master race and retainer therebehind;

Figure 2 is a view in front elevation of the device, the master stylus and specimen stylus and showing the master and specimen races in vertical section;

Figure 3 is a view in section taken along line 3—3 of Figure 2 showing the mounting and adjustment means for the master race and its stylus;

Figure 4 is a top plan view of the device;

Figure 5 is a view in longitudinal section taken through the specimen race and retaining means therefor;

Figure 6 is a view in section taken along line 6—6 of Figure 5;

Figure 7 is a view in longitudinal section taken through the master race and adjustable supporting means therefor;

Figure 8 is a view in section taken along line 8—8 of Figure 7;

Figure 9 is an enlarged fragmentary view of the scale end of the master stylus; and Figure 10 is a similar view of the pointer end of the specimen stylus.

Referring more particularly to the drawings, the device may include a base 1 carrying a stylus supporting head 2 and a specimen supporting head 3. Head 2 carries a pin 4 which may extend through anchorage parts 5, 6 and 7 of the head. The master stylus includes a collar 8 rotatably mounted about pin 4 and an inner arm 9 carrying a stylus point 10 and an outer offset arm 11 with a Lucite tip 12 secured thereto by a screw 13 and having line gradations 14 thereon. The specimen stylus includes a collar 15 rotatably mounted about pin 4 and an inner arm 16 carrying a stylus point 17 and an outer offset arm 18 having a pointer 19 secured thereto by a screw 20.

The head 3 is connected to base 1 by a dovetail joint 21 to permit sliding of head 3 in a fore and aft direction, as shown in Figure 2. The support for the master race 22, shown in section in Figure 2, is generally indicated at 23 which is carried by head 3. In detail the master race 22 is carried by a block 24 that is slidably mounted fore and aft by a dovetail joint 31 in a wedge 27 and thus movable by a screw 25 screw-threaded in block 24 and operable by a knurled hand knob 26. The collar portion 25' of screw bolt 25 is rotatable in support 23 and otherwise restricted to movement in vertical slot 23a in support 23. The bottom of wedge 27 has an inclined bottom surface comparable in inclination to the top surface of a block 28 that is slidably movable in support 23 by a screw 29 screw-threaded into block 28 and operable by a knurled knob 30. The collar portion 29' of screw bolt 29 is rotatable in support 23 and otherwise restricted to movement in vertical slot 23B in support 23. As viewed in Figure 7, an operation of knob 39 to move block 28 to the left results in the raising of block 24 and the master race 22 and correspondingly a movement of block 28 to the right permits block 24 and master race 22 to be lowered. By operating knob 26 the block 24 may be moved to the left or right to center the master race 22 into correct position.

For supporting the specimen race 32 there is provided an upright 33 rigid or integral with head 3. To upright 33 is secured a block 34 by means of screws 35. To block 34 are secured a pair of spaced balls 36 by soldering or other means in such a manner as to engage two points of block 34 on either side of the apex 37 of the angular contour of the block. Diametrically oppositely of the apex 37 the balls are provided with flattened portions 38 so that the two extremities of each flattened portion make a two point contact with the radius of the specimen race in order to further stabilize the centering of the race. Slidably mounted in block 34 is an inner block 39 between which and the outer block 34 is disposed a compression coil spring 40. Similarly secured to block 39 is a ball 41 with an outer flat surface 42. The specimen race is merely slipped on over the three balls against the action of spring 40 which latter resiliently holds it in place.

The head 3 for supporting the mounting means for the master and specimen races is movable in a fore and aft direction to impart an equal fore and aft movement to the two race supports which is permitted by the dovetail joint 21. Manual movement and adjustment is effected by means of a knurled knob 43 mounted for rotation in a stationary base bracket 44 and carrying a screw bolt 45 in engagement with a threaded bore 46 in head 3. Rotation of knob 43 in one direction causes head 3 and the two race supports to be moved from left to right and rotation in the opposite direction moves head 3 from right to left, as viewed in Figure 3. If desired, the knob 43 may be provided with a handle 47.

In operation the specimen race 32 is slipped on to its support to be engaged by balls 36 and 42 and the carriage moving knob 43 is rotated to bring the specimen stylus 17 into engagement with the center of the radius of specimen race, or the central depth portion thereof, as shown in Figure 2. By means of a simple adjustment device engaging the specimen stylus arm 18 the stylus is positively adjusted to limit counterclockwise movement and resiliently maintained against clockwise movement about pin 4. This adjustment means is carried by the head 2 and a bracket 48 secured thereto and is identical with that provided for the master stylus which includes a bracket 49 in which latter there is provided an Allen head screw 50 for bearing against the upper surface of master race stylus arm 11 and a plunger pin 51 slidable in head 2 and urged upwardly against the bottom surface of arm 11 by a spring 52. Before such an adjustment is made to position master race stylus arm 11, care is taken through the adjustment knobs 26 and 30 to make sure that the master race is perfectly aligned with the specimen race while the master stylus point 10 is in engagement with the center of the radius of the master race 22 and that the tip of the center one of the gradation lines 14 of the Lucite tip 12 of the master stylus arm is exactly in registry with the horizontally adjacent pointer tip 19 of the specimen stylus arm while the stylus points 10 and 17 are in their respective positions in master and specimen races 22 and 32 shown respectively in Figures 3 and 2.

Subsequent rotation of hand knob 43 or handle 47 causes each stylus point 10 and 17 to bear and ride on the radius of their respective races to an equal extent of movement. If the radius contour of the specimen race is exactly the same as that of the master race there will be no relative movement between pointer 19 and the center one of the three line gradations 14. On the other hand any variance between the radius contour of the master and specimen races as they are moved back and forth in engagement with stylus points 10 and 17 will be visually indicated as the pointer registers at a point below or above the center one of lines 14.

For high precision ball bearing race machining work it is often desired to hold overall tolerances down to .0070, plus or minus .0001 inch, or in other words approximately .0035 plus or minus .0001 inch below or above the center one of the three lines 14 of the Lucite tip 12. Accordingly the distance between each of the three lines is such as will be traversed by the pointer in response to movements of the stylus on the specimen race in the magnitude of .0035 inch. Thus the distance between the top and bottom line is such as will be traversed by the pointer in response to movement of the stylus on the specimen in the magnitude of .007 inch.

Naturally such space between lines 14 is greatly enlarged and exaggerated in Figure 9 for illustrative purposes and furthermore the three lines thus spaced appear, without magnification, as a single line. The purpose of arranging these extra lines on either side of the center one is to, by visual observation and comparison, note any deviations of the radius curvature of the specimen race with respect to that of the master race. As long as the pointer remains in registry with the area bounded by the top and bottom lines the specimen race is acceptable but if not it is rejected as unsuitable for use.

Machines for magnification are available in the art, such as the well known Jones and Lampson Comparator. This comprises a table to movably support the device above disclosed as well as a source of light and lens means for magnification in the order of 150 or more to 1 so as to optically project the relationship of pointer 19 with respect to lines 14 in such dimensions as to be clearly discernible.

I claim:

1. A device for comparing and visually indicating the relative conformance between the surface contours of a master and a specimen work piece, said device comprising movable heads for supporting said master and specimen work pieces in adjacent spaced relationship, means on one of said heads for adjusting in two planes the relative positions of said work pieces, a stylus for each of said work pieces each comprising an arm mounted on a stationary pivot and carrying a stylus point at its one end resiliently urged to engage the surface contour of its corresponding work piece, and manual means for moving said heads and said work pieces jointly therewith and equally with their surface contours each in engagement with its stylus point whereby the relative positions of said stylus arms will visually indicate the relative conformity between said surface contours.

2. A device for comparing and visually indicating the relative conformance between the radius surface contours of a master and a specimen antifriction bearing race, said device comprising movable heads for supporting said master and specimen races in adjacent spaced relationship, means on one of said heads for adjusting in two planes the relative positions of said races, a stylus for each of said races each comprising an arm mounted on a stationary pivot and carrying a stylus point at its one end resiliently urged to engage the surface contour of its corresponding race, and manual means for moving said heads and said races jointly therewith and equally with their surface contours each in engagement with its stylus point whereby the relative positions of said stylus arms will visually indicate the relative conformity between said surface contours.

3. A device for comparing and visually indicating the relative conformance between the radius surface contours of a master and a specimen anti-friction bearing race, said device comprising a base and separate movable heads for supporting said master and specimen races in adjacent spaced relationship, means on one of said heads for adjusting in two planes the relative positions of said races, a stylus for each of said races each comprising an arm pivotally connected to said base and carrying a stylus point at its one end resiliently urged to engage the surface contour of its corresponding race, one of said stylus arms carrying at its other end a pointer and the other a reference scale and manual means for moving said heads and said races jointly therewith and equally with their surface contours each in engagement with its stylus point whereby said pointer by reason of its juxtaposition with said scale visually indicates the relative conformity between said surface contours.

4. A device for comparing and visually indicating the relative conformance between the radius surface contours of a master and a specimen anti-friction bearing race, said device comprising a base and a movable head for releasably and resiliently centering and supporting said specimen race, a separate movable head for supporting said master race in adjacent spaced relation to said specimen race and manually operable means for adjusting said master race in two planes relatively to said specimen race, a stylus for each of said races each comprising an arm pivotally connected to said base and carrying a stylus point at its one end resiliently urged to engage the surface contour of its corresponding race, one of said stylus arms carrying at its other end a pointer and the other a reference scale, and manual means for moving said heads and said races jointly therewith and equally with their surface contours each in engagement with its stylus point whereby said pointer by reason of its juxtaposition with said scale visually indicates the relative conformity between said surface contours.

5. A device for comparing and visually indicating the relative conformance between the radius surface contours of a master and a specimen anti-friction bearing race, said device comprising a base a head and mounting means including a pair of sliding blocks with spring means therebetween and carrying balls with flattened surfaces to engage the inner surface of said specimen race to releasably and resiliently center and support the same, a separate head and mounting means thereon for supporting said master race in adjacent spaced relation to said specimen race and manual means for adjusting said master race in two planes relatively to said specimen race, a stylus for each of said races each comprising an arm pivotally connected to said base and carrying a stylus point at its one end resiliently urged to engage the surface contour of its corresponding race, one of said stylus arms carrying at its other end a pointer and the other a reference scale and manual means for moving said heads and said races jointly therewith and equally with their surface contours each in engagement with its stylus point whereby said pointer by reason of its juxtaposition with said scale visually indicates the relative conformity between said surface contours.

6. A device as claimed in claim 1 in which there is provided manually adjustable means for engaging each stylus arm to position the same and positively limit its pivotal movement in one direction and resiliently oppose movement thereof in the opposite direction.

7. A device as claimed in claim 2 in which there is provided manually adjustable means for engaging each stylus arm to position the same and positively limit its pivotal movement in one direction and resiliently oppose movement thereof in the opposite direction.

8. A device as claimed in claim 3 in which there is provided manually adjustable means for engaging each stylus arm to position the same and positively limit its pivotal movement in one direction and resiliently oppose movement thereof in the opposite direction.

9. A device as claimed in claim 4 in which there is provided manually adjustable means for engaging each stylus arm to position the same and positively limit its pivotal movement in one direction and resiliently oppose movement thereof in the opposite direction.

10. A device as claimed in claim 5 in which there is provided manually adjustable means for engaging each stylus arm to position the same and positively limit its pivotal movement in one direction and resiliently oppose movement thereof in the opposite direction.

JONAS FLOYD GREGG.